United States Patent
Dietz et al.

(10) Patent No.: US 6,737,636 B2
(45) Date of Patent: May 18, 2004

(54) IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION

(75) Inventors: Zachary Dietz, Logmont, CO (US); Charles E Moore, Loveland, CO (US); Hugh Wallace, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/453,391

(22) Filed: Jun. 3, 2003

(65) Prior Publication Data

US 2003/0205666 A1 Nov. 6, 2003

Related U.S. Application Data

(62) Division of application No. 09/845,544, filed on Apr. 30, 2001, now Pat. No. 6,603,111.

(51) Int. Cl.[7] .................................................. G01J 3/50
(52) U.S. Cl. ......................................................... 250/226
(58) Field of Search ................................. 250/226, 221, 250/252.1; 348/663, 665; 345/158, 160, 161, 168, 175

(56) References Cited

U.S. PATENT DOCUMENTS 6,408,331 B1 * 6/2002 Rhoads ....................... 709/217
6,647,128 B1 * 11/2003 Rhoads ....................... 382/100
2002/0149702 A1 * 10/2002 Satoh ........................... 348/663

* cited by examiner

*Primary Examiner*—Tu T. Nguyen
(74) *Attorney, Agent, or Firm*—Edward L. Miller

(57) ABSTRACT

Optical navigation upon grainy surfaces whose orientation is inclined at about 45° to the X and Y axes of the navigation mechanism is enhanced by: First, detect that a spatial filter in use is inappropriate for the orientation presently occurring, and; Second, employ a different and more appropriate spatial filter subsequent to such detection. Two spatial filters have been developed that are respectively effective about the 45° and 135° inclinations of the Standard filter. The shape of a correlation surface used in the navigation process is tested for the presence of a transverse ridge in the correlation surface. This generates control metrics whose filtered excursions are tracked by a control system that changes the spatial filter in use. The control system incorporates a time constant to prevent thrashing and excessive sensitivity to isolated random variations. The direction from which illumination arrives relative to the X and Y axes affects the range of angles (relative to, say, the Y axis) that a filter is effective, by changing the apparent size and proportions of the highlights and shadows that are the perceived features ultimately navigated upon. Stable operation of the control system can be enhanced by ensuring overlap of the filters' ranges, and can be promoted by dynamically altering the direction from which illumination reaches the navigation surface, so that it corresponds to, or varies in relation with, the filter in use.

2 Claims, 11 Drawing Sheets

THE "STANDARD" FILTER

A CELL = 1 IF < $\emptyset$, $\emptyset$ IF ≥ $\emptyset$

| b-a+f-g | c-a+f-h | d-b+g-i | e-c+h-j | e-d+i-j |
|---|---|---|---|---|
| b-a+k-l | c-a+k-m | d-b+l-n | e-c+m-o | e-d+n-o |
| g-f+p-q | h-f+p-r | i-g+q-s | j-h+r-t | j-i+s-t |
| l-k+u-v | m-k+u-w | n-l+v-x | o-m+w-y | o-n+x-y |
| q-p+u-v | r-p+u-w | s-q+v-x | t-r+w-y | t-s+x-y |

ENLARGED IMAGE FILTERED WITH THE STANDARD FILTER

IMAGE FILTERS AND SOURCE OF ILLUMINATION FOR OPTICAL NAVIGATION UPON ARBITRARY SURFACES ARE SELECTED ACCORDING TO ANALYSIS OF CORRELATION DURING NAVIGATION

REFERENCE TO RELATED APPLICATIONS

This Application is a Division of an earlier filed application Ser. No. 09/845,544 of the same title, filed Apr. 30, 2001, now issued as U.S. Pat. No. 6,603,111 and assigned to Agilent Technologies, Inc.

The subject matter of the instant Application is related to that of U.S. Pat. No. 6,057,540 entitled MOUSELESS OPTICAL AND POSITION TRANSLATION TYPE SCREEN POINTER CONTROL FOR A COMPUTER SYSTEM filed Apr. 30, 1998, and is also related to the subject matter described U.S. Pat. No. 5,578,813 filed Mar. 2, 1995, issued Nov. 26, 1996 and entitled FREEHAND IMAGE SCANNING DEVICE WHICH COMPENSATES FOR NON-LINEAR MOVEMENT. This application is also related to the subject matter described in U.S. Pat. No. 5,786,804, issued on Jul. 28, 1998, filed Oct. 6, 1995, entitled METHOD AND SYSTEM FOR TRACKING ATTITUDE, and also assigned to Hewlett-Packard Co. These three Patents describe techniques for the tracking of position movement, which techniques include components of the preferred embodiment described below. Accordingly, U.S. Pat. Nos. 6,057,540//5,578,813 and 5,786,804 are hereby incorporated herein by reference.

BACKGROUND OF THE INVENTION

Optical navigation upon arbitrary surfaces produces motion signals indicative of relative movement along the directions of coordinate axes, and is becoming increasingly prevalent. It is used, for instance, in optical computer mice and fingertip tracking devices to replace conventional mice and trackballs for the position control of screen pointers in windowed user interfaces for computer systems. It has many advantages, among which are the lack of moving parts that accumulate dirt and suffer the mechanical wear and tear of use. Another advantage of an optical mouse is that it does not need a mouse pad, since it is generally capable of navigating upon arbitrary surfaces, so long as they are not optically featureless.

Optical navigation operates by tracking the relative displacement of images. A two dimensional view of a portion of the surface is focused upon an array of photo detectors, whose outputs are digitized and stored as a reference image in a corresponding array of memory. A brief time later a sample image is also digitized. If there has been no motion, then the sample image and the reference image are identical (or very nearly so). What is meant, of course, is that the stored arrays appear to match up. If, on the other hand, there has been some motion, then the sample image will appear to have shifted within its borders, and the digitized arrays will no longer match (that is, if their borders are also lined up). The matching process is termed "correlation" and may be performed in various ways, one of which is described in the incorporated Patents. Considered in isolation, correlation answers the narrow question "Are these two images aligned?" When the answer is "No," it could be because of intervening motion in any direction, and some additional mechanism is needed to find the direction and amount of displacement that will produce correlation results of "Yes" or "Almost." What is done is to perform correlations between one of the stored images (say, the reference image) and a collection of shifted versions of the other (sample) image. The shifts are no shift, one over, one over and one up, one up, one over in the other direction, etc., for eight actual shifts and one "null" shift. We would then expect that one of these nine correlations would be better than all the others, and its direction and amount of shift is taken as an indication of the intervening motion.

The navigation mechanism maintains velocity (speed and direction) information. When a new sample frame is to be correlated with the reference frame a predicted shift can be used as the starting point for the nine shifts. With this arrangement the correlation results contribute to an updated velocity and either ratify or modify the motion just predicted. Prediction is used to "pre-shift" the reference frame, until such time as the new sample frame fails to overlap a significant portion of the shifted reference frame. At that time a new reference frame is taken. Prediction can be used to slow the sample rate down to conserve power (if the light source is pulsed, or can be turned off between samples) when the current velocity is low.

The basic technique described above works quite well when the surface produces images that appear as regions of light and dark defined by closed boundaries. The boundaries need not be abrupt; they can be gradual. And, if the shapes of the regions are sufficiently non-symmetrical or irregular, then any closure requirement for the boundaries can be relaxed. The shift and correlate mechanism may encounter difficulty, however, when there is a lot of symmetry and no closed boundaries. Say, for example, a mouse were navigating upon a wood grained desk. Under the right circumstances, the images presented to the correlator could appear to represent a series of parallel lines. It is easy to detect motion in the direction across the lines, but not in the direction along the lines. The result is an outfoxed mouse and a frustrated user. (Grainy surfaces are only sometimes troublesome. Much depends upon feature size, as well as orientation. Parallel features whose separation is less than the spacing between photo detectors are not resolved as separate entities. Difficult cases arise for parallel features that align with, say, every other (second) or every third photo detector. In general, the more the feature separation varies from those troublesome cases, the less difficulty arises. Just because a surface is grainy does not mean that it can produce a difficult case.)

One solution to this occasional difficulty would be to increase the resolution with which images are represented. One might magnify the image more, increase pixel density, or digitize each pixel to a greater number of bits. The hope is that eventually what appears to be regular repeating (and thus indistinguishable) features become irregular (and thus distinguishable from one another). Each of these solutions has its own disadvantage, among which are increased cost and complexity, and a need for greater speed just to maintain a given rate of tracking over the surface.

Another technique that has been used to mitigate the parallel line problem is (spatial) filtering the images before they are correlated. The idea is to modify the arrays to be correlated such that a regular pattern in the data is suppressed, at least in part. This allows the response of the correlation mechanism to be based more on irregular features in the image and less on regular recurring features that produce strong correlations not dependent upon motion. The idea is similar to filtering out a known strong signal to recover a weaker one. The filtering is performed by altering the values in the various positions of an array according to arithmetic combination with the values in symmetrically opposed positions disposed around the location of interest. The removal of an interfering signal by common mode rejection with a differential amplifier comes to mind. An example will be given in due course, but even at present it will be suspected that this technique distorts or alters the image being tracked. This is acceptable, since we are not particularly interested in such fidelity, anyway. We are never going to display to anyone the contents of the array as an image; we simply want to track it. The prior art contains different spatial filters usable in the manner we have just described, and once a suitable one has been identified by the designer it is simply incorporated as a permanent feature into the system.

One such (spatial) filter has been used in conventional optical mice to deal with the problem of parallel lines arising from, say, wood grain. It is effective in two orthogonal directions (relative to the spatial pattern with which the array of photo sensors is laid out), and we shall call it the "Standard" filter. There is, however, a substantial range of orientations midway between these two axes that fool the Standard filter, and at which the mouse again begins to appear confused if it encounters long parallel features. What to do?

SUMMARY OF THE INVENTION

A solution to the problem of optically navigating upon grainy surfaces whose orientation is inclined at about 45° to the X and Y axes of the navigation mechanism is to: First, detect that the spatial filter in use is inappropriate for the orientation presently occurring, and; Second, employ a different and more appropriate spatial filter subsequent to such detection. Two additional filters have been developed that are respectively effective about the 45° and 135° inclinations (the trouble regions) of the Standard filter (which is oriented along the X and Y axes). A test has been developed for the shape of a correlation surface (or bowl, if viewed from underneath) used in the navigation process. The test uses the presence of a transverse ridge (or saddle) in the correlation surface (bowl), and generates control metrics whose excursions are tracked by a control system that changes the filter in use. The control system incorporates a time constant to prevent thrashing and excessive sensitivity to isolated random variations. The direction from which illumination arrives relative to the X and Y axes appears to have an effect on the range of angles (relative to, say, the Y axis) that a filter is effective, by changing the apparent size and proportions of the highlights and shadows that are the perceived features ultimately navigated upon. For example, if light strikes the navigation surface as rays essentially parallel to the Y axis (a common practice) then the angular range of operation (for grain orientation) of the Standard filter about the X axis may be about half the corresponding range about the Y axis. Similar asymmetries in the ranges of operation are noticed in the inclined filters. The operation of the control system can be enhanced by ensuring overlap of the ranges of filter operation, lest lack of overlap induce control system instability. Filter range overlap can be promoted by dynamically altering the direction from which illumination reaches the navigation surface so that it corresponds to, or varies in relation with, the filter in use.

DEMONSTRATION OF THE PROBLEM

Before we undertake an explanation of the solution to the problem, it will be convenient to demonstrate the problem. In the course of that we shall present some simplified examples that will serve as good "before" and "after" illustrations, and further assist us by providing a useful notation that we may use in subsequent discourse. Definite examples will also remove some of the aura of abstraction that might otherwise contaminate the desired understanding.

Figure 1:
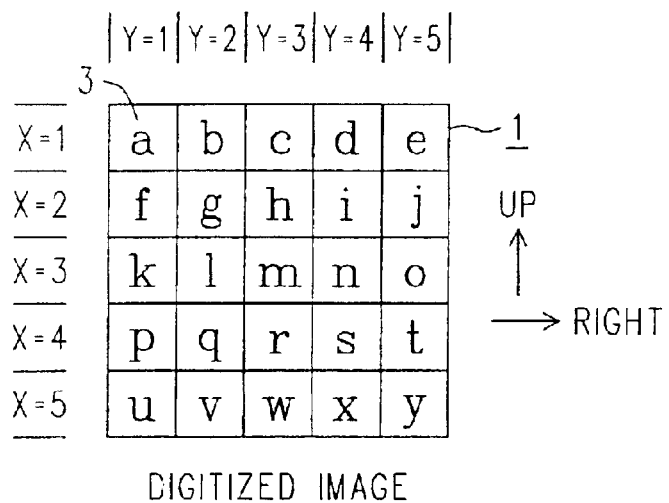
FIG. 1 is a depiction of a twenty-five cell digitized image for an optical navigation system that is stored in memory as a two dimensional data structure.

Refer now to FIG. 1, wherein is depicted a five pixel (X=1 to 5) by five pixel (Y=1 to 5) image array (1) of twenty-five digitized values (a–y) obtained from an array of photo sensors (not shown). The digitized image array 1 may be thought of as being twenty-five six-bit (or perhaps eight-bit) values stored in a memory data structure organized as a two dimensional array. In a preferred optical navigation circuit for a mouse or other pointing input device for a computer, the actual digitized image would preferably be sixteen by sixteen, or perhaps eighteen by eighteen. We choose to proceed in this explanation with five by five, not so much for intellectual simplification (the same issues arise), but because the size of the actual case is inconveniently large, both in terms of drawing real estate and in terms of notation consumed, without adding any real benefit over a smaller rendition such as the five by five case we show.

To proceed then, FIG. 1 represents an optical image that has been focused on an array of photo detectors (not shown), digitized and then stored in memory. Further, it might be an image that has just been acquired (a sample image) or it might be one that has been obtained some time ago and is being used as a reference image.

Figure 2:
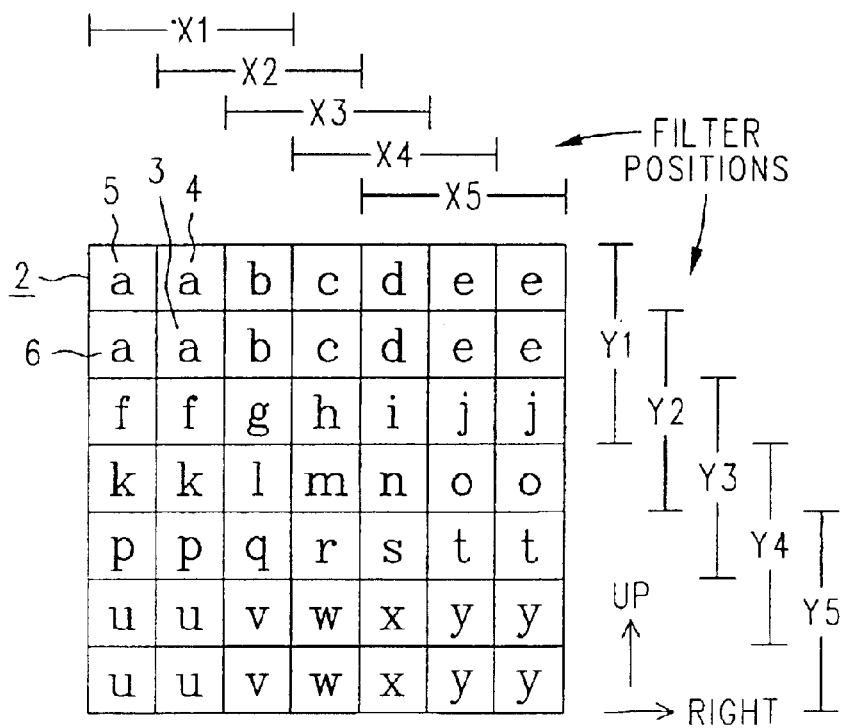
FIG. 2 is an image after the fashion of FIG. 1, but that has been artificially enlarged to facilitate filtering.

Both sample and reference images are (spatially) filtered before they are used by the correlation process. Since the images are of finite extent, we can expect any filtering process to exhibit some transient-like behavior at the edges of the image. To minimize the effect of this on the correlation mechanism, we first expand the images to be filtered. How this is done is shown in FIG. 2. Note that the expansion moves the outer edges of the array out one row or column, in each direction as appropriate, with the original four corners each being replicated three times. Thus, array 1 of FIG. 1 becomes expanded array 2 in FIG. 2, and has seven rows and seven columns. Observe how, for example, the original value 'a' (3) is replicated in the expansion as three more "a's" (4, 5 and 6). The same thing happens to 'e', 'u' and 'y' in the other corners.

Notice also that FIG. 2 depicts twenty-five locations (the Cartesian product of five X positions called X1 through X5 and five Y positions called Y1 through Y5). Each of these twenty-five locations defines a nine member (three by three) ordered collection that will be an instance of input to the filter. The filter operates on the ordered nine members (which are multi-bit numbers) and produces a single numerical output that we will associated with the center of the three by three input.

It should not be assumed that only three by three filters are appropriate. Other filter sizes may be used, and they might also be asymmetrical (e.g., three by four).

Figures 3, 4:
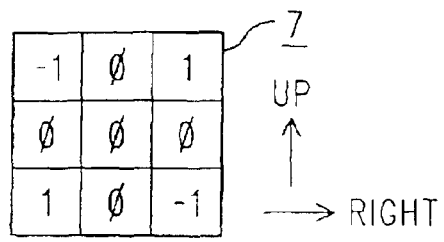
FIG. 3 is an illustration of a "Standard" filter used in the prior art but that causes problems when diagonal grain is encountered.
FIG. 4 illustrates the arithmetic outcome of filtering an enlarged image of FIG. 2 with the filter of FIG. 3.

The filter we shall term the "Standard" filter is shown in FIG. 3. It is an array 7 of nine coefficients that is positioned over the enlarged image in each of the twenty-five filter positions indicated by the X(1–5) by Y(1–5) indices. At each of these locations it produces a single output value according to the summations of the cells contributing as multiplied by the coefficients in the filter. The array 8 in FIG. 4 indicates exactly what five-by-five filtered array will result from application of the Standard filter 7 in FIG. 3 to the expanded array 2 of FIG. 2.

There is one additional filter property that we need to mention, however. If the digitized inputs were, say, eight-bit values then according to the arithmetic indicated in FIG. 4 we might need ten-bit values to record the results, if we were to faithfully preserve the resulting arithmetic values. We could do that, but we don't. Instead, we take another approach. While we want to correlate images with their shifted versions, we find that we can do that as readily by responding only to the "shape" of the image, as by giving importance to the "shading" of the image. We accomplish this by taking only the sign bit of the filter's numerical result as the output of the filter. (In another embodiment, one might choose to take some intermediate number of bits.) In taking only the sign bit we may sacrifice a small amount of certainty from time to time, but we gain a tremendous benefit in terms of reduced circuit complexity, reduced size and cost of the optical navigation IC, perhaps even increased speed of operation for a given clock rate. Accordingly, we fabricate the filter to simply output the one bit sign of the actual arithmetic result for those operations associated with the filter and that are indicated in the various cells of FIG. 4. With this arrangement (which we shall use in the figures that follow), a one as a filter output indicates that the numerical result for that cell was negative, while a zero indicates that it was zero or positive.

Figure 5:
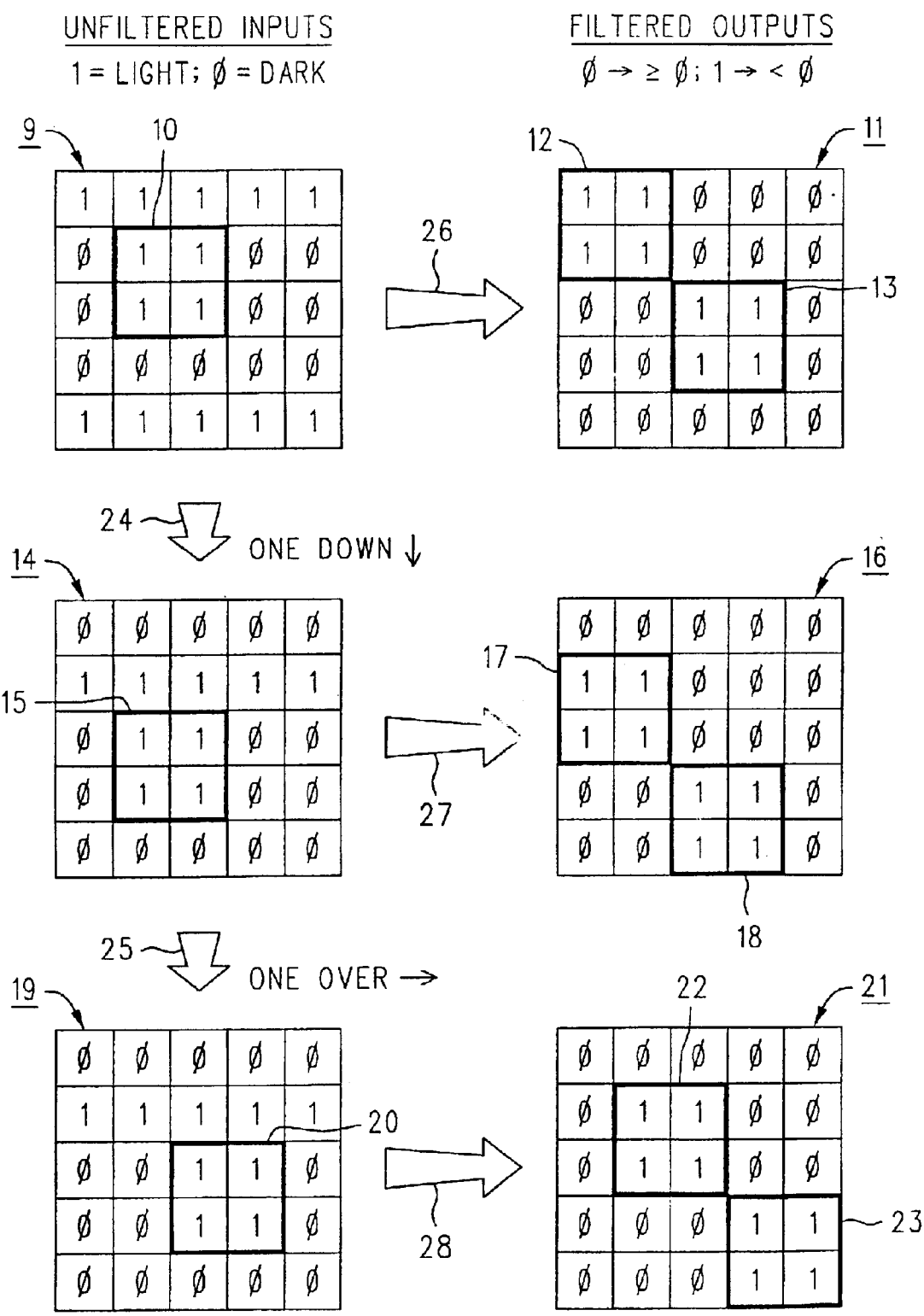
FIG. 5 is an example showing a moving input image against horizontal grain and its usable filtered results.

Now refer to FIG. 5, where we illustrate a simplified prior art case where the Standard filter behaves in a suitable manner. On the left-hand side of FIG. 5 are three input images 9, 14 and 19 that arise from a sequence of mouse movements over an unchanging image, as indicated by arrows 24 and 25. The movements are separated by one pixel "down" (image 9 to 14) and then by one pixel "over" (image 14 to 19). The images include a distinguishable feature that is a square of four adjacent 1's (shown for convenience only in heavy boxes 10, 15 and 20 in images 9, 14 and 19, respectively). These unfiltered input images (9, 14 and 19) include a horizontal grain component, which was added to show that it is filtered out, as it is supposed to be. That horizontal grain component is the top row of 1's in 9, which then becomes next row down from the top in input images 14 and 19.

Before proceeding we need to identify a potentially confusing simplification that will be present from FIG. 5 onward. We have said that the values that populate the input arrays 9, 14 and 19 are multi-bit values. For the sake of simplicity in our figures from FIG. 5 on, however, we will pretend that we need represent only the conditions of "light" and "dark", which we will indicate with the one-bit symbols "1" and "0", respectively. We could have used "L" and "D" instead, but then somebody would complain "Hey, how do I do arithmetic on L and D . . . ?" It may help to think of the "1's" (L's) as being the larger multi-bit (integer) numbers, while the "0's" (D's) are the smaller numbers, and that the filter incorporates some type of AC coupling (i.e., tends to ignore steady state circumstances). Alternatively, one can think of the input image array as having been digitized to one bit: one for light and zero for dark. We don't really do that in the actual part, but the simplification is valid, and it is useful in our examples. Just don't forget (and this is the potential for confusion) that on the output side of the filter we have a sign bit, where one means negative and zero non-negative, which may seem at variance with the way the inputs are described. And while the output notation amounts to a desirable simplification, it is an actual one that we do use in the real parts. That said, however, we are never going to take advantage of the idea that "This number is negative, and therefore . . . ". As explained above (shape versus shading), the ones and zeros in the filter output are just the two symbols in a minimal description.

In summary, the filter is simply an operational combinatorial rule of arithmetic that is applied to a symbol set on the input image. It maps nine adjacent input values into one value in the filtered output. Many different adjacent filter positions are used to create the filtered output image. And while one can compare neighbor symbols in the input or in the output, it is not fair to think that an input symbol (say, a "1") is an indivisible nuclear entity that passes untransformed through the filter and simply comes out the same kind of thing that it was, but just in a different place. We may agree that fundamentally they are all numbers, but what they mean before and after filtering are not the same things. And we must remember that our use of only single "1's" and single "0's" on the input side of the filter (which is unfortunately similar to the "1's" and "0's" on the output side) is strictly a useful convenience (in place of multi-bit values), once properly understood.

To resume, then, note how arrows 26, 27 and 28 relate the filtered outputs (11, 16 and 21) to their respective unfiltered inputs (9, 14 and 19). We note three important things. First, the horizontal grain of the inputs is removed. Well, that is, in part, what the Standard filter is for. Second, note how input features 10, 15 and 20 (which are really the same thing, just in a different location in the input image, owing to motion of the mouse), are matched by corresponding output features 12/13, 17/18 and 22/23. Now, it is true that feature 12/13 in the filtered output image 11 scarcely matches the original input feature 10 in unfiltered input image 9; in fact, we might say that the feature 10 was deformed (went "splat") when it went through the filter. That's okay, since in every case, the feature was deformed (went "splat") in the same way. What is more, and this is the third important thing to note, the locations in the filtered images 11, 16 and 22 of the deformed features varies proportionally (exactly one to one) as the variation of the corresponding input feature in the unfiltered images. It is this well behaved correspondence that allows the correlator to track the deformed image as readily as if it were not deformed.

Figure 6:
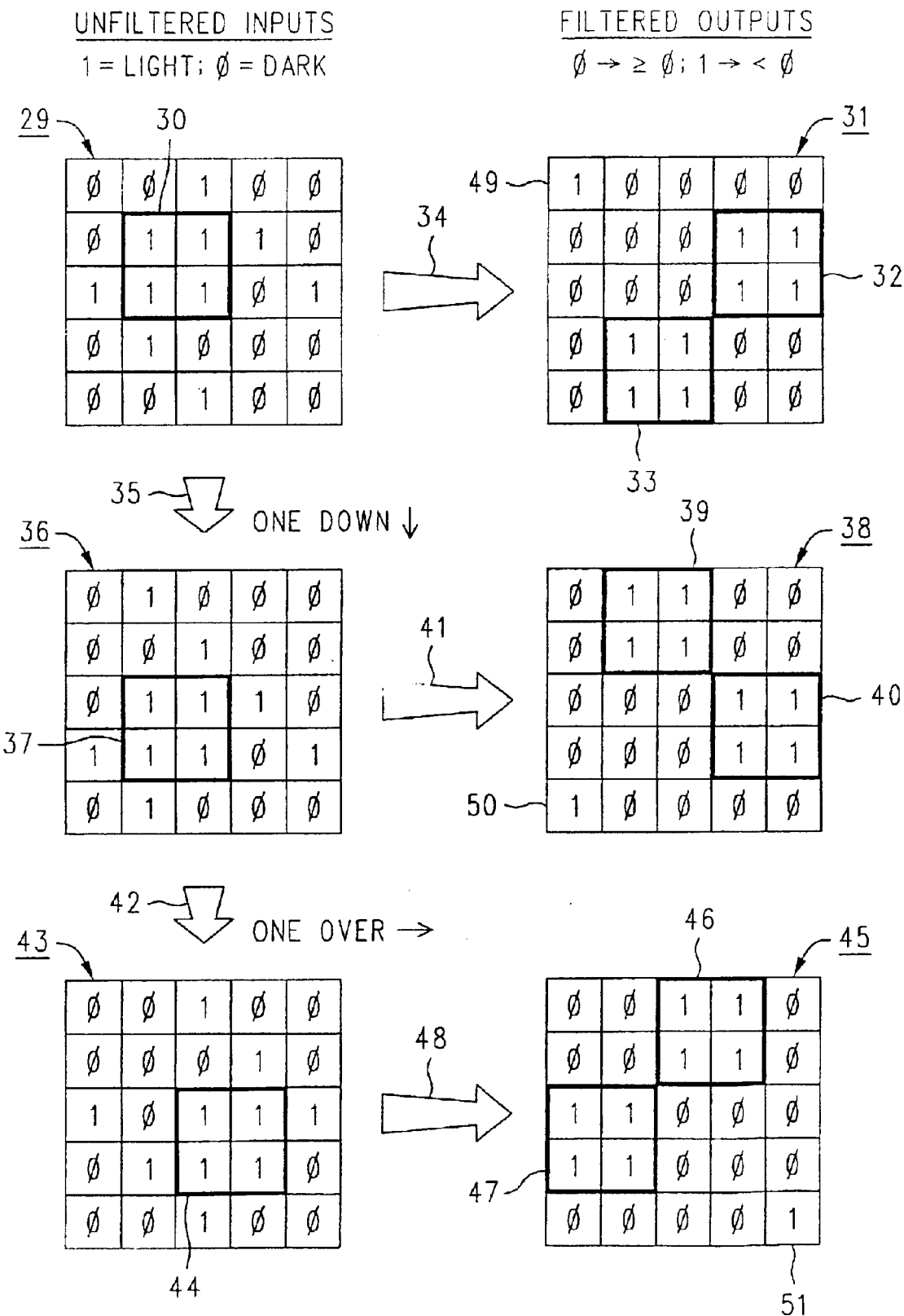
FIG. 6 is an example showing the same moving input image as in FIG. 5, but against diagonal grain, and illustrates the production of unusable results from the Standard filter.

Now take a look at FIG. 6. It is again a sequence of three unfiltered input images 29, 36 and 43, with one pixel of "down" motion (arrow 35) followed by one pixel of "over" motion (arrow 42). That is, we note that the mouse motion for FIG. 5 is the same as for FIG. 6. Also as before, we have (the same!) input feature of four adjacent ones (shown in heavily outlined squares 30, 37 and 44). In this case, however, there is a mild diagonal grain as "background" (running from upper left to lower right).

But now notice the filtered outputs 31, 38 and 45, whose correspondence to their unfiltered counterparts is indicated by arrows 34, 41 and 48, respectively. The input feature (30, 37, 44) still goes "splat", but not in a well behaved way. The orientation of 32/33 is different from that of 39/40, and seemingly inconsistent with that of 46/47. The output feature 32/33 etc. moves in a way that does not correspond to movement of the input feature 30. (We note also the unexpected different appearances of 1's 49, 50 and 51. These, however, are probably artifacts of the expansion at the image boundary and of the reduced size of our example, and can probably be ignored rather than taken as evidence of filter misbehavior.) All in all, that pesky Standard filter 7 of FIG. 3 is fickle, and has left us in the lurch! All of this sends the correlator out to lunch (it gets terminally confused). This disgusting situation is what we have set out to fix.

DESCRIPTION OF A PREFERRED EMBODIMENT

Figure 7:
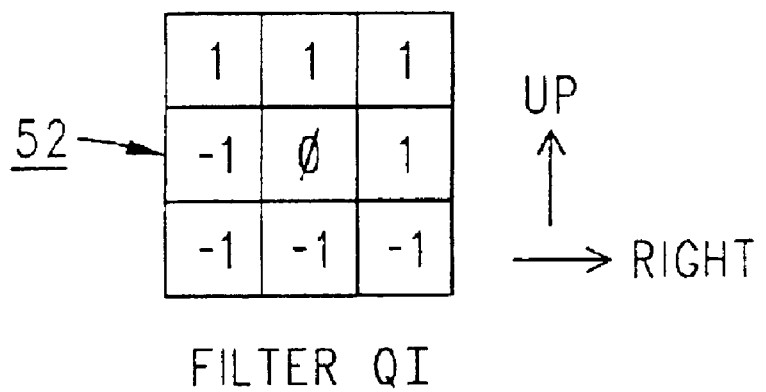
FIG. 7 is an illustration of a filter that can be used under certain circumstances when the Standard filter of FIG. 3 fails.
Figure 8:
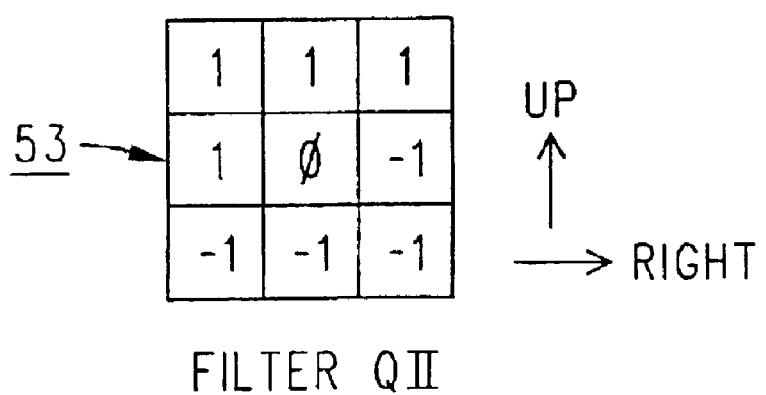
FIG. 8 is an illustration of another filter that can be used under certain other circumstances when the Standard filter of FIG. 3 fails.

Refer now to FIGS. 7 and 8, wherein are shown two filters 52 and 53 (respectively) that may be used in circumstances when the Standard filter 7 of FIG. 3 causes problems owing to diagonal grain in the unfiltered input image.

Figure 9:
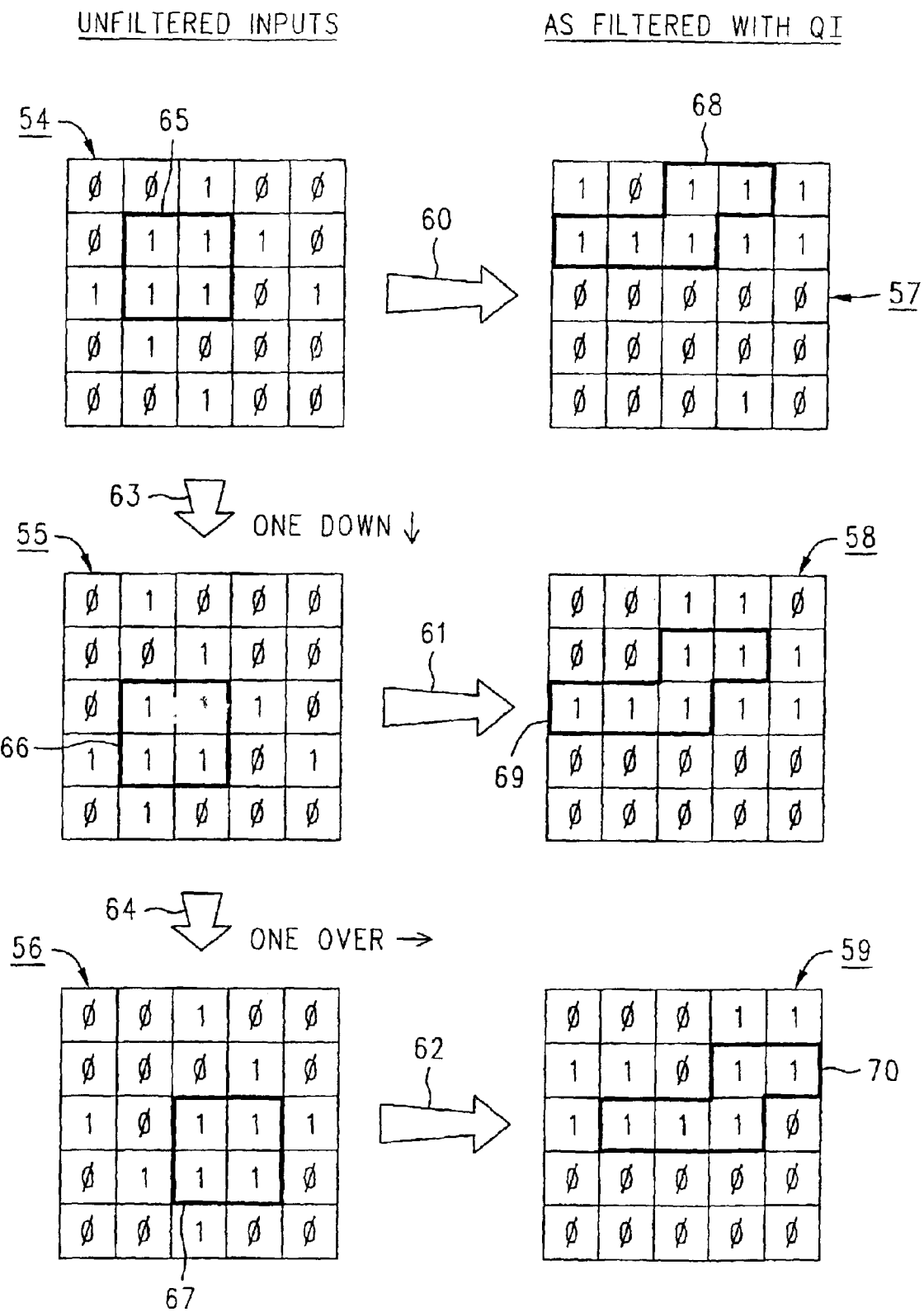
FIG. 9 is an example showing the moving input image of FIG. 6 but filtered with the filter of FIG. 7 to produce usable results.

Without further ado, let's see what these filters do with the situation that out-foxed the Standard filter and flummoxed the correlator. Refer then, to FIG. 9, where we start just as in FIG. 6 (where the Standard filter failed) but apply the filter QI instead. As before, we have three input images 54, 55 and 56 accompanied by input features 65, 66 and 67 (all of which are the same as 29, 36, 33 and 30, 37, 44 of FIG. 6). There is even the same cursor motion of one down (arrow 63) and one over (arrow 64) as in FIG. 6. Arrows 60, 61 and 62 relate the unfiltered input images to filtered images 57, 58 and 59, respectively. As feature 65 (four adjacent 1's in a square pattern) goes through filter QI it still goes "splat", and comes out a squished and crooked pattern 68 that does not even have the same number of 1's. The filter QI is well behaved where it counts, however. Note that patterns 69 and 70 are similarly squished and crooked, and that their positions track that of their originating features in the unfiltered images. Filter QI 52 of FIG. 7 works where the Standard filter failed.

Before proceeding further, another note on notation is in order. Suppose that we knew that a parallel grain was present, and we arranged for it to appear as vertical lines. Looking at it, we could say that the top was twelve o'clock, and that there were other positions as well, such as three o'clock and nine o'clock. Let us make the following angular correspondences: twelve o'clock is 0°, three o'clock is 90°, six o'clock is 180°, nine o'clock is 270°, and so forth, with all the other values lying in the obvious way between those we have mentioned. Now ask the predominant direction (if there is one) of a feature in the image, and give it a direction in degrees according to the preceding convention. The first quadrant (QI) is, of course, the angles zero through ninety degrees, and has a reflection in the third quadrant. The second quadrant (QII) is, of course, the range of ninety through one hundred eighty degrees, and has a reflection in the fourth quadrant. The filter 52 shown in FIG. 7 is called "Filter QI" because it appears to work best on features whose axes lie approximately centered in the first and third quadrants, when the above conventions are followed. So, for example, look at FIG. 9 and identify the diagonal grain running from upper left to lower right. Now rotate the figure clockwise about 45° so that the grain appears to be vertical. Now notice that the major axis of the clump of 1's (there are eight that are adjacent) appears to be in the first quadrant. The filter QI works better on this example than does its companion QII. The filter 53 of FIG. 8 is called "Filter QII" because it appears to work best on features whose axes lie approximately centered in the second and fourth quadrants.

Figure 10:
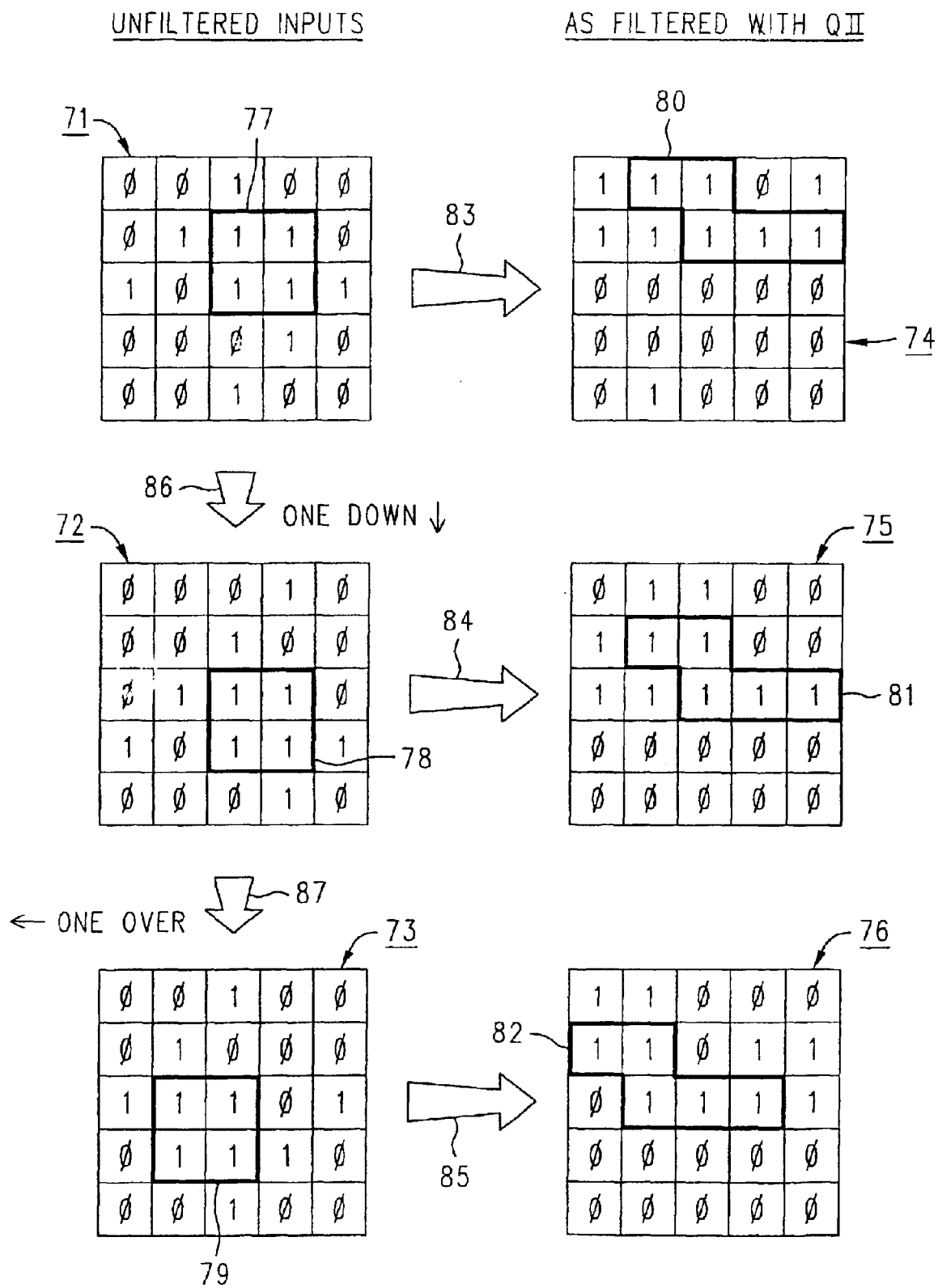
FIG. 10 is an example similar to FIG. 9, but using the filter of FIG. 8.

FIG. 10 is an example similar to that of FIG. 6, where we expect the Standard filter to fail, but that the filter QII 53 functions. In that figure we see that there are again three unfiltered image inputs 71, 72 and 73, that each contain an image feature (77, 78 and 79, respectively). In this case, however, the diagonal grain runs form upper right to lower left, and the feature (four adjacent 1's highlighted in heavy boxes 77, 78 and 79) starts out in a slightly different location and moves along a slightly different path. Arrow 86 indicates that it moves down one pixel from image 71 to become image 72, while arrow 87 indicates that image 72 moves over one pixel to the left to become image 73 (previous examples moved to the right). The correspondence between unfiltered input (71, 72 and 73) and filtered output (74, 75 and 76) is indicated by arrows 83, 84 and 85, in the same manner as for other figures. Likewise, note the regularly moving and well behaved (even if they did go "splat") output features 80, 81 and 82. They will not confuse the correlator, and can be navigated upon.

To be sure, these filters QI 52 and QII 53 are not, even between them both, able to entirely replace the Standard filter 7 of FIG. 3. That is, they will each fail if used in unfavorable circumstances, just as the Standard filter will. Furthermore, the Standard filter works quite well along the coordinate axes (as defined above, which is to say, for vertical and horizontal grain). But between these three filters we do have complete coverage. What we need then, is a way to use the different filters in those circumstances that they are each best suited for.

A tool has been developed that predicts the best filter to use as the mouse navigates over the surface. To explain what it is and how it works we first need to say a bit more about the next steps in the optical navigation process: prediction and correlation. Each of these concepts is relatively easy to appreciate in isolation, and are discussed at some length in the incorporated Patents. We won't dwell on them at any great length here, mentioning only what is needed to proceed.

The optical navigation system keeps track of its velocity (speed and direction), and uses that information to predict where the next sample frame will probably fall on the reference frame in use. That is to say, where on the (filtered) reference frame should the next (filtered) sample frame be centered prior to correlation.

Figure 11:
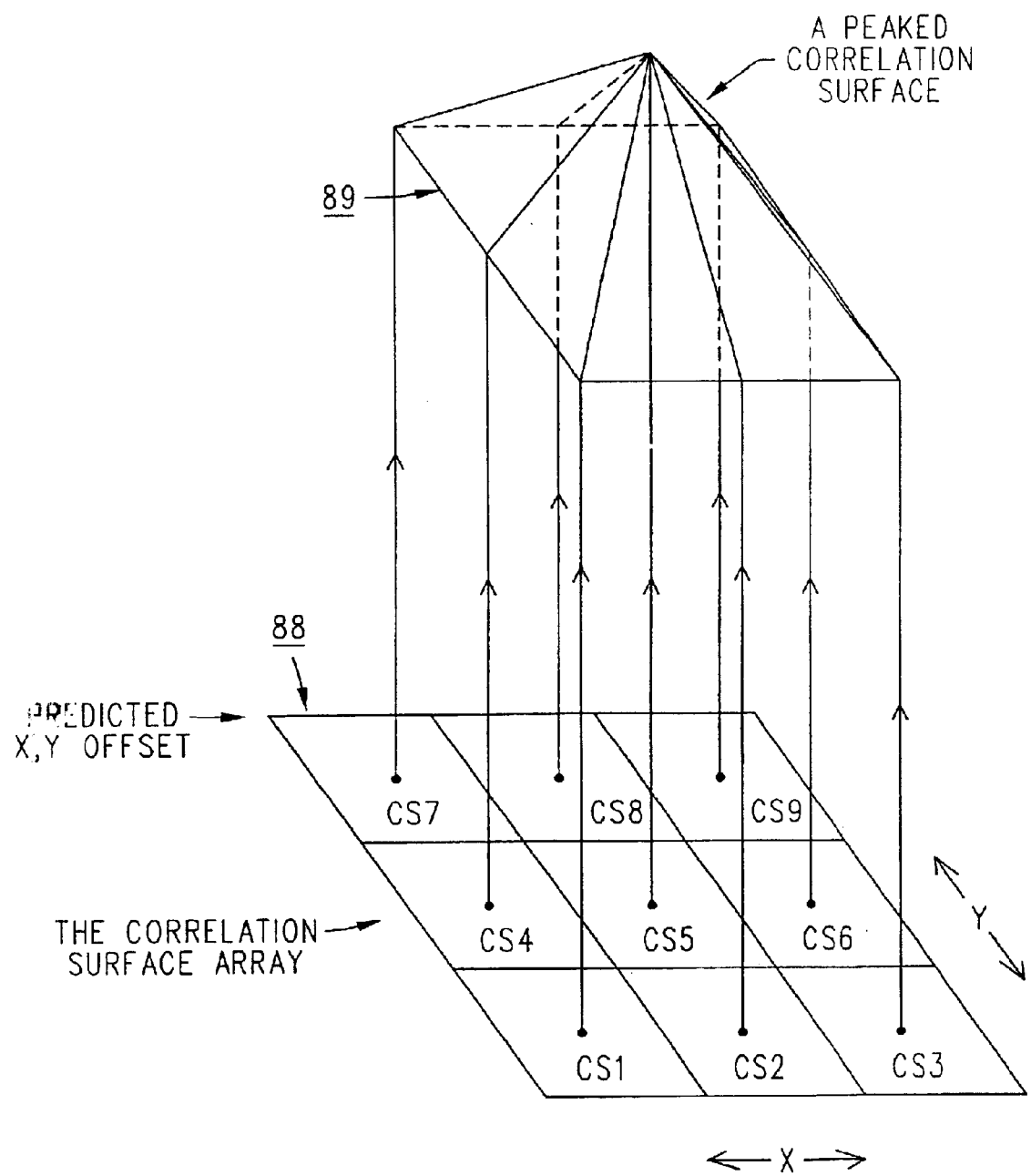
FIG. 11 is an illustration of a sample correlation surface produced from an array of correlation values.

Correlation involves the making of nine (or perhaps more, but nine is typical) comparisons between the nine trial sample frame positions and the reference frame, with the idea being that at one of those positions the images will line-up or match better than at any of the others. The nine positions are: no change (use the prediction unaltered); one pixel up; one pixel up and one to the left; one up and one to the right; one to the left; one to the right; one down; one down and one to the left; and, one down and one to the right. In the system we have set out herein, with the filter outputs being sign bits only, the comparison process at each trial position for correlation is relatively easy. At each trial position, we simply count the number of differences (or alternatively, the number of 1's) between corresponding locations for the two images. The result is nine numbers that we may arrange in an array corresponding to the different correlation shifts used to find them. The effect to describe a correlation surface, which, under favorable circumstances, has certain properties. Say, for example, that the surface we are navigating upon is free of grain or any other poisonous artifacts, that mouse velocity is well within limits, and that everything is generally operating as it should. We then expect that the last prediction would be correct, and that the peak of the correlation surface would be at the center cell of the nine, with the remaining eight cells all having substantially smaller values. This is the kind of situation depicted in FIG. 11, where the array 88 of nine correlation values (CS1 through CS9), if projected as being surface elevations, would produce a peaked correlation surface 89. Some writers have viewed the correlation surface from "underneath" as opposed to "from above" as we are doing here. When viewed from below a well formed correlation surface resembles a "bowl" and is sometimes so called.

(A slight digression is in order to keep this simplified discussion simple while at the same time keeping it honest. Clearly, a five by five sample frame is not adequate in a system that uses prediction and correlation as described. How could we have a reference frame of such small size and predict the next sample to correlate three over and four up? There would not be any overlap within which to correlate! So we appreciate the utility of larger sample frames. But even so, as we shift to do prediction we guarantee that portions of the sample frame will not overlap the reference frame (and will therefore not contribute), and what is worse, for some trial shifts there will be greater potential overlap of the images than for others. What this means is that, unless we do something to correct it, the nine correlation numbers will not all have the same units, and cannot properly be directly compared to one another. That is, for trial shifts where there is greater mis-registration between the frame boundaries, there are simply fewer pixel locations in the first place to count toward a good match of the images. So, the correlation process "normalizes" the correlation numbers so that they all have the same weight despite the varying degrees of frame boundary mis-registration associated with their individual calculation circumstances. It is these normalized numbers that we use for the correlation surface, and which drive the navigation process.)

The tool we shall use to predict the best filter to use analyzes the shape of the correlation surface. The tool will detect when the correlation surface 89 develops transverse ridges, instead of having an isolated peak. We note that transverse ridges could appear in two ways: aligned with the axes and diagonally. With that in mind, we define the following two metrics:

$$AR = \mathscr{F}\{CS8-CS4+CS2-CS6\} \quad (1)$$

$$DR = \mathscr{F}\{CS7-CS9+CS3-CS1\} \quad (2)$$

The metric AR (for Axial Ridge) indicates presence of a transverse ridge that runs in a direction parallel with one of the axes. If the absolute value of AR gets above a certain threshold (say, 15% or 20% of the maximum value of a cell in the correlation array 88), then we become suspicious of how well the filter in use is performing. The "raw" component of AR (the sum of the two differences within the braces) is filtered by an exponential or auto-regression mechanism ($\mathscr{F}$) to retard its rate of change by a suitable time constant. Furthermore, only images whose separations in the X and Y axes are small enough to imply a good correlation surface are used to calculate AR. The idea is that AR will be used as input to a servo-control mechanism, the image data is apt to be somewhat noisy, and we don't want to the servo to be too easily "spooked" by an isolated random excursion in the data. The other metric DR (Diagonal Ridge) indicates the presence of a transverse ridge that runs in a direction diagonal with the axes, and is calculated with restricted input and filtered in the same manner as is AR. It, too, has an associated threshold for creating suspicion. And while we could steer an image filter selection mechanism from these two metrics considered individually, we prefer to combine them into one indicator, thus:

$$RM=\sqrt{(AR^2+DR^2)} \quad (2)$$

RM (Ridge Metric) will get larger as either of AR or DR get larger in magnitude, and although there are other ways to take note of the individual values of AR and DR, RM is a convenient way to unify a common meaning of those two metrics into a single indicator. We are not yet finished with AR and DR, however. We note that the signs of AR and DR contain useful information. If we assume that in a system of the sort we have been describing that a correlation surface can get transverse ridges, then we can also expect that a properly operating system will not experience, after suitable filtering, non-transient troughs in its correlation surface (or in a bowl). We decline to offer a rigorous proof of this, but it is indeed the case, and navigation by correlation depends upon it. Anyhow, it follows that if (and this is how our angular measure convention was stated) the Y axis is in the CS2-CS5-CS8 direction, then AR>0 implies that there is a ridge along that axis. If AR<0 it implies that there is a transverse ridge along the X axis. The sign of DR can likewise be interpreted to distinguish between the two possible diagonal ridges.

Figure 12:
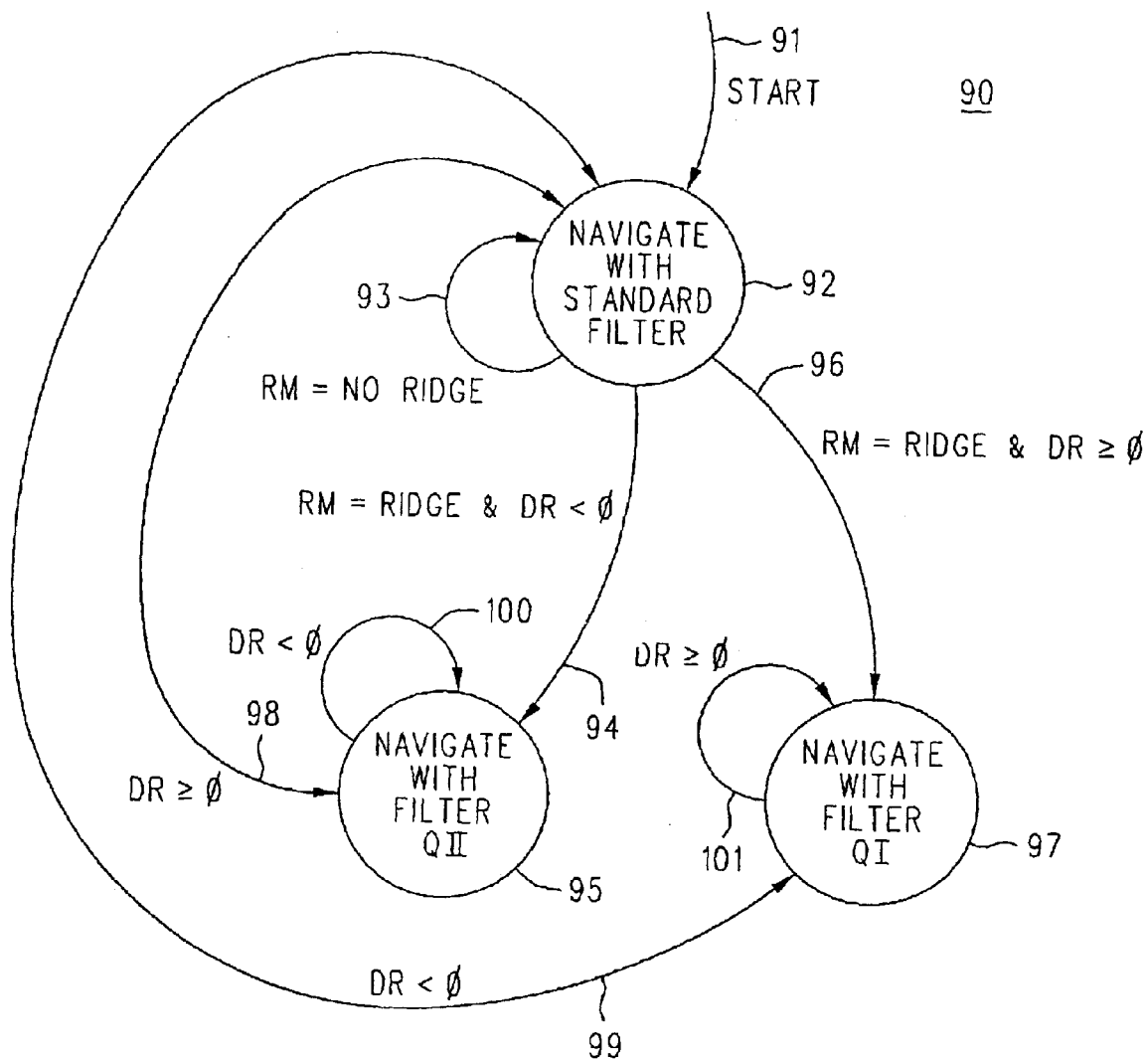
FIG. 12 is a state diagram illustrating a filter selection process based on the shape of a correlation surface that may be followed during optical navigation to avoid the mischief caused by a grain unfavorable to a filter in use.

Refer now to FIG. 12, which is a state diagram 90 of how an optical navigation system, such as for a mouse, and using the techniques set out herein, may be made less susceptible to the mischief caused by grain in the surface to be navigated upon. At the conclusion of certain initial conditions (turn on, reset, etc.) a transition START 91 enters a state 92 NAVIGATE WITH STANDARD FILTER. While in this state the optical navigation system operates mostly in a conventional manner and uses the Standard Filter 7, except that it is calculating and monitoring AR, DR and RM. The transition 93 from state 92 to itself indicates this for situations where RM has a value that indicates an absence of ridges in the correlation surface 89.

Now suppose that the value of RM changes to indicate the emergence of a ridge in the correlation surface 89. Since it is the Standard filter 7 that is presently in use, we may assume that it is a diagonal ridge that is appearing, as we know the Standard filter is effective in removing axial ridges. There are two ways that a diagonal ridge can appear, however (upper left to lower right, and upper right to lower left), and the filter QI 52 has, in one embodiment, been found to work best for upper left to lower right, while the filter QII 53 has been found to work best for diagonal grain going from upper right to lower left. The difference between the two cases is indicated by the sign of DR, as explained previously. Accordingly, if RM is high enough and DR<0, then transition 94 leads to the state 95 NAVIGATE WITH FILTER QII. Transition 100 keeps state 95 in effect as long as DR<0 remains the case. If DR changes sign to DR>0, however, transition 98 puts state 92 NAVIGATE WITH STANDARD FILTER back into effect.

On the other hand, if while in state 92 RM is high enough and DR>0, then transition 96 leads to the state 97 NAVIGATE WITH FILTER QI. Transition 101 keeps state 97 in effect as long as DR>0 remains the case. If DR changes sign to DR<0, however, transition 99 puts state 92 NAVIGATE WITH STANDARD FILTER back into effect.

Now, some remarks are in order. It will be recalled that earlier we gave a convention for describing angular orientation of navigable features relative to the direction of the grain. It can also be used to describe the positions of rotated grain for a given filter, or for different filters, relative to an original condition.

In keeping with earlier teachings, it is desirable that the light source create highlights and shadows on the surface to be navigated upon. This is best done by creating a low or "grazing" angle of incidence for the light from the source of illumination. In the embodiment in which the filters QI and QII were developed and used the source of illumination was located at (according to our angular convention) 180°. The ranges of filter effectiveness that resulted overlapped each other, and were somewhat larger than the selected operating ranges shown in the table below:

| | |
|---|---|
| Standard Filter | 320°–40°, 85°–95°, 140°–220°, 265°–275° |
| Filter QI | 40°–85°, 220°–265° |
| Filter QII | 95°–140°, 275°–320° |

It can be seen from the above table that the Standard filter has different ranges of operation about the X axis 90° than about the Y axis. It appears that the wider range of operation abut the Y axis arises from the visibility of the grain being minimized by end-on illumination, compared to the X axis case where the visibility of the grain is maximized by broadside illumination. Coping with the X axis case is left entirely up to the filter, whereas in the Y axis case the manner of illumination assists the filter.

We note that neither filter QI nor filter QII is centered over either of the diagonals 45° nor 135°, or over their extensions of 225° and 315°. It appears that the reason for this asymmetry lies more in the nature of the filters QI and QII themselves. Nevertheless, they cooperate well with the Standard filter by operating in the regions not covered by the Standard filter. For example, the Standard filter does not operate from 45° to 80°, but that region is covered by the 40° to 85° section of filter QI. This example is one of four such instances.

Now, to return to the algorithm expressed by the state diagram 90 of FIG. 12, if one of states 95 or 97 is in effect, then there is a diagonal grain present, and what is more, as between the two states, they each represent maximally different diagonal grains. And while it might happen somehow that the grain for each state gets worse (DR gets more negative for state 95, or more positive for state 97), we find it difficult to imagine how it could abruptly go from one type of diagonal to the other (DR changes sign). SOoo, if DR does change sign, the safest thing to do is to get back to the Standard filter, because if the direction of the grain is changing significantly (or a perverse user is rotating the mouse), it is reasonable to expect it to pass next through a region covered by the Standard filter. Any other arrangement would risk loop instability.

Now, there is yet another method for reducing the effects of unfavorable grain orientation to the filter, and that is to dynamically alter the location of the source of illumination, so as to illuminate the grain along the direction of its axis. In circumstances where the grain is essentially groves and their intervening shoulders, this can have the effect of minimizing the long stringy shadows (and their adjacent parallel highlights) that reveal the grain during broadside illumination. So, in some circumstances we could alter the direction on illumination instead of changing filters.

It is true that changing illuminators would probably require a brief training period for setting the level of illumination and AGC, etc., but these need only a short time and the optical navigation runs a pretty high rate (and with a low enough duty cycle) that this extra overhead would not be objectionable. Also, no increase in power consumption need be accompanied by this strategy.

Figure 13:
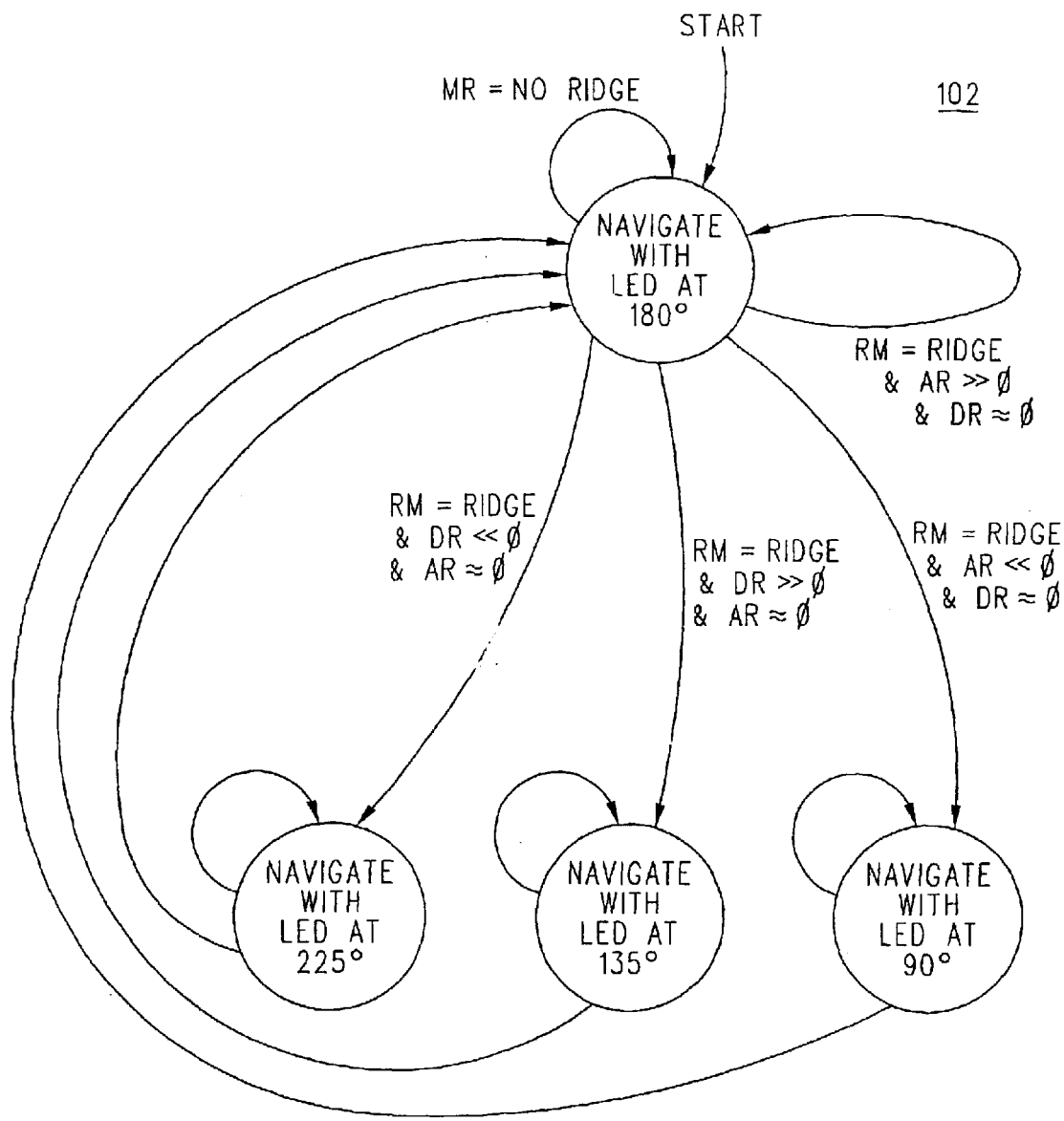
FIG. 13 is state diagram similar to that of FIG. 12, but incorporating a change in illumination location that is controlled by an examination of the shape of a correlation surface.
Figure 14:
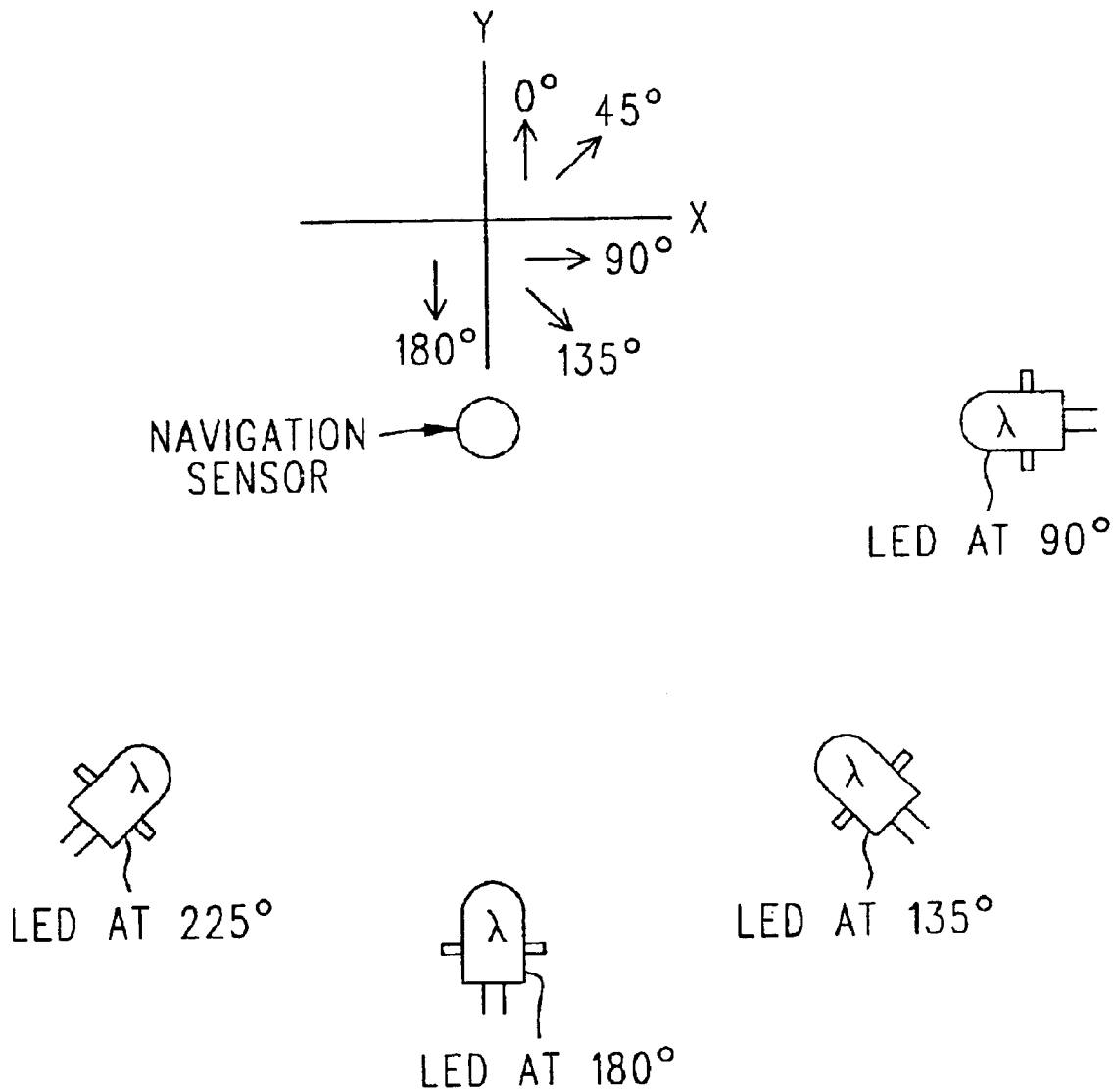
FIG. 14 is a diagram showing the locations of sources of illumination selectable by analysis of correlation results.

The state diagram 102 of FIG. 13 illustrates how this can be implemented, assuming that the different locations of illumination shown in FIG. 14 are available. If there were more cells than nine in the correlation surface, then greater granularity than just two kinds of axial granularity and two kinds of diagonal granularity could be observed, and a more refined response in terms of a selected location for illumination would be possible.

Lastly, it may be preferable to combine the two strategies, so that the filter in use is changed and the location of the source of illumination is altered, as well. Suppose, for example, that the surface being navigated upon has a grain that, instead of being actual groves, is a pattern of discrete holes or projections whose highlights and shadows combine to synthesize a grain. The discrete nature of the holes or projections would mean that they continue to create highlights and shadows (they remain visible as grain) regardless of the direction of illumination. The amount of grain in the image presented to the spatial filter would thus vary only slightly as a function of the direction of illumination.

We claim:

1. In an optical navigation system, a method of minimizing the effect of grain upon navigation, the method comprising the steps of:

(a) navigating with a first source of illumination in a first location;

(b) while navigating according to step (a), generating an ordered collection of correlation values;

(c) examining the ordered collection of correlation values generated in step (b) for the presence of a ridge in a correlation surface described by the values in the ordered collection;

(d) if the examination in step (c) reveals a ridge, then extinguishing the first source of illumination and commencing to navigate with a second source of illumination in a second location;

(e) while navigating according to step (d), examining an ordered collection of correlation values produced while the second source of illumination is in use; and (e1) continuing to navigate according to step (d) while the examination in step (e) reveals the absence of a ridge; and (e2) if the examination in step (e) reveals a ridge, then extinguishing the second source of illumination, re-instituting the use of the first source of illumination, and resuming navigation according to step (a).

2. A method as in claim 1 wherein the first and second sources of illumination are selected to maximize the end-on illumination of the revealed ridge.

* * * * *